US011218247B2

(12) United States Patent
Lo et al.

(10) Patent No.: US 11,218,247 B2
(45) Date of Patent: Jan. 4, 2022

(54) SYSTEMS AND METHODS FOR DETECTING A SCRAMBLING SEED IN COMMUNICATION WITH AN UNMANNED AIRCRAFT SYSTEM

(71) Applicant: SkySafe, Inc., San Diego, CA (US)

(72) Inventors: Brandon Fang-Hsuan Lo, San Diego, CA (US); Chun Kin Au Yeung, San Diego, CA (US); Scott Torborg, San Diego, CA (US)

(73) Assignee: SKYSAFE, INC., San Diego, CA (US)

( * ) Notice: Subject to any disclaimer, the term of this patent is extended or adjusted under 35 U.S.C. 154(b) by 0 days.

(21) Appl. No.: 17/073,053

(22) Filed: Oct. 16, 2020

(65) Prior Publication Data

US 2021/0152283 A1 May 20, 2021

Related U.S. Application Data

(60) Provisional application No. 62/937,596, filed on Nov. 19, 2019.

(51) Int. Cl.
*H04L 1/00* (2006.01)
*H04L 25/03* (2006.01)
*H04L 27/26* (2006.01)

(52) U.S. Cl.
CPC ...... *H04L 1/0054* (2013.01); *H04L 25/03866* (2013.01); *H04L 27/2649* (2013.01)

(58) Field of Classification Search
CPC ............. H04L 1/0054; H04L 25/03866; H04L 27/2649
See application file for complete search history.

(56) References Cited

U.S. PATENT DOCUMENTS 5,345,539 A 9/1994 Webb
9,275,645 B2 3/2016 Hearing et al.
(Continued)

FOREIGN PATENT DOCUMENTS

EP 3422038 A1 1/2019
WO WO 2018/125686 A2 7/2018
WO WO 2019/032162 A2 2/2019

OTHER PUBLICATIONS

Angelosante et al., "Estimating multiple frequency-hopping signal parameters via sparse linear regression,"IEEE Transactions on Signal Processing, vol. 58, No. 10, pp. 5044-5056, Oct. 2010.
(Continued)

*Primary Examiner* — Jaison Joseph
(74) *Attorney, Agent, or Firm* — Knobbe Martens Olson & Bear, LLP

(57) ABSTRACT

A system and method for detecting a scrambling seed in communication between a drone and a controller are described. The system comprises a radio-frequency (RF) receiver configured to receive an RF signal transmitted between the drone and a controller. The RF signal includes scrambled data that contain repetitions of unscrambled data based on known scramblers with an unknown scrambling seed. The system further comprises a memory device in communication with a hardware processor and having stored computer-executable instructions to cause the hardware processor to identify the smallest number of bits required in each segment of scrambled data for data combining by finding an invertible predetermined matrix. The hardware processor is configured to determine the unknown scrambling seed based on a function combining the predetermined matrix, transition matrices of scramblers, and segments of received scrambled data.

20 Claims, 9 Drawing Sheets

(56) References Cited

U.S. PATENT DOCUMENTS

| | | | |
|---|---|---|---|
| 9,529,360 | B1 | 12/2016 | Melamed et al. |
| 9,763,177 | B1 | 9/2017 | Baskaran et al. |
| 9,996,079 | B2 | 6/2018 | Magy et al. |
| 10,051,475 | B2 | 8/2018 | Shattil et al. |
| 10,237,743 | B2 | 3/2019 | Shattil et al. |
| 10,317,506 | B2 | 6/2019 | Seeber et al. |
| 2006/0071671 | A1 | 4/2006 | Tola |
| 2011/0255587 | A1* | 10/2011 | Yoshikawa ......... H04L 25/0224 375/232 |
| 2014/0349666 | A1 | 11/2014 | Sun |
| 2017/0148332 | A1* | 5/2017 | Ziemba ................ G08G 5/0039 |
| 2017/0295551 | A1 | 10/2017 | Sadiq |
| 2018/0017665 | A1 | 1/2018 | Wittenberg |
| 2018/0081355 | A1* | 3/2018 | Magy ..................... H04L 67/12 |
| 2018/0262900 | A1 | 9/2018 | Moon |
| 2020/0382156 | A1* | 12/2020 | Lo ....................... H04B 1/7136 |

OTHER PUBLICATIONS

Beyme et al. "Efficient Computation of DFT of Zadoff-Chu sequences," Elec. Letters (2009) vol. 45, No. 9, pp. 461-463.

"Drone Market Is Estimated To Expand At a Healthy CAGR in the Upcoming Forecast 2025," [Online] Sep. 13, 2019 https://www.americanewshour.com/?s=Drone+Market+Is+Estimated+To+Expand+At+a+Healthy+CAGR+in+the+Upcoming+Forecast+2025.

"Evolved Universal Terrestrial Radio Access (E-UTRA); Physical Channels and Modulation," 3GPP TS 36.211 (2018) vol. 15.0.

"FCC Part 15.247 Test Report for GL300A (FCC ID:SS3-GL3001501)," Tech. Rep., Apr. 2015. [Online]. Available: https://fccid.io/SS3-GL3001501/Test-Report/Test-Report-Rev-2599009.

"FCC Part 15.247 Test Report for GL300C (FCC ID: SS3-GL3001510)," Tech. Rep., Oct. 2015. [Online]. Available: https://fccid.io/SS3-GL3001510/RF-Exposure-Info/SAR-Test-Report-2805129.

"FCC Part 15.247 Test Report for GL300F (FCC ID:SS3-GL300F1609)," Tech. Rep., Sep. 2016. [Online]. Available: https://fccid.io/SS3-GL300F1609/Test-Report/Test-Report-3155813.

Federal Aviation Administration, "FAA aerospace forecasts fiscal years 2019-2039," 2019. [Online]. Available: https://www.faa.gov/data research/aviation/aerospace forecasts/.

Fischler et al., "Random sample consensus: A paradigm for model fitting with applications to image analysis and automated cartography," Communications of the ACM, vol. 24, No. 6, pp. 381-395, Jun. 1981.

Gul et al. "Timing and Frequency Synchronization for OFDM Downlink Transmissions Using Zadoff-Chu Sequences," IEEE Trans. On Wireless Comm. (2015) vol. 14, No. 3, pp. 1716-1729.

International Search Report dated Jul. 14, 2020, issued in corresponding International Application No. PCT/US2020/032391, filed May 11, 2020.

International Search Report dated Sep. 8, 2020, issued in corresponding International Application No. PCT/US2020/034969, filed May 28, 2020.

Kim et al. "A delay-robust random access preamble detection algorithm for LTE system," Proc. RWS (2012) pp. 7578.

Liang et al. "The Research on Random Access Signal Detection Algorithm in LTE Systems," 2013 $5^{th}$ IEEE Intl. Symp. On Microwave, Ant. Prop. And EMC Tech. for Wireless Comm. (2013) pp. 115118.

Liu et al., "Joint hop timing and frequency estimation for collision resolution in FH networks," IEEE Transactions on Wireless Communications, vol. 4, No. 6, pp. 3063-3074, Nov. 2005.

Lo, et al., "HopSAC: Frequency Hopping Parameter estimation Based on Random Sample Consensus for Counter-Unmanned Aircraft Systems", MILCOM 2019—2019 IEEE Military Communications Conference (MILCOM), IEEE Nov. 12, 2019, pp. 355-360.

Nelson et al. "The View From Above: A Survey of the Public's Perception of Unmanned Aerial Vehicles and Privacy," J. of Urban Tech. (2019) vol. 26, issue 1, pp. 83-105.

Tao et al. "Improved Zadoff-Chu Sequence Detection in the Presence of Unknown Multipath and Carrier Frequency Offset," IEEE Comm. Letters (2019) vol. 22, No. 5, pp. 922-925.

Wang et al., "Frequency-hopping signal parameters estimation based on orthogonal matching pursuit and sparse linear regression,"IEEE Access, vol. 6, pp. 54 310-54 319, Sep. 2018.

Yu et al. "Random access algorithm of LTE TDD system based on frequency domain detection," Proc. Int. Conf. Semantics, Knowl. Grid (2009) pp. 346350.

Zhao et al., "Robust frequency-hopping spectrum estimation based on sparse bayesian method," IEEE Transactions on Wireless Communications, vol. 14, No. 2, pp. 781-793, Feb. 2015.

International Search Report dated Feb. 2, 2021, corresponding to PCT Patent Application No. PCT/US2020/055944.

Vo-Huu et al. "Fingerprinting Wi-Fi Devices Using Software Defined Radios" College of Computer and Information Science, Northeastern University. ACM. Jul. 18, 2016. pp. 3-13.

Simon et al., "On the Implementation and Performance of Single and Double Differential Detection Schemes", IEEE Transactions On Communications, IEEE Service Center, Piscataway, NJ. USA, vol. 40, No. 2, Feb. 1, 1992 (Feb. 1, 1992), pp. 278-291.

International Preliminary Report on Patentability issued in application No. PCT/US2020/032391, dated Jul. 19, 2021.

International Search Report and Written Opinion issued in application No. PCT/US2021/031801, dated Aug. 17, 2021.

* cited by examiner

SYSTEMS AND METHODS FOR DETECTING A SCRAMBLING SEED IN COMMUNICATION WITH AN UNMANNED AIRCRAFT SYSTEM

CROSS-REFERENCE TO RELATED APPLICATION(S)

This application claims the benefit of U.S. Provisional Application No. 62/937,596, filed Nov. 19, 2019, which is hereby incorporated by reference in its entirety.

BACKGROUND

Technological Field

The systems and methods disclosed herein are directed to detecting, monitoring, and mitigating the presence of a drone. More particularly, the systems and methods detect, demodulate, and decode a radio-frequency (RF) signal transmitted between the drone and a drone controller.

Description of the Related Technology

Unmanned Aircraft Systems (UAS), more commonly known as drones, are used extensively in a large number of exciting and creative applications, ranging from aerial photography, agriculture, product delivery, infrastructure inspection, aerial light shows, and hobbyist drone racing. Despite the usefulness of drones in many applications they also pose increasing security, safety, and privacy concerns. Drones are being used to smuggle weapons and drugs across borders. The use of drones near airports presents safety concerns, which may require airports to shut down until the surrounding airspace is secured. Drones are also used as a tool of corporate and state espionage activities. Thus, there is demand for an effective Counter-Unmanned Aircraft System (CUAS) solution to detect and monitor drones and mitigate the threat of drones when necessary.

SUMMARY

The systems, methods and devices of this disclosure each have several innovative aspects, no single one of which is solely responsible for the desirable attributes disclosed herein.

A system and method for detecting communication between a drone and a controller are described. In one embodiment, the system comprises a radio-frequency (RF) receiver configured to receive an RF signal transmitted between the drone and a controller. The RF signal includes scrambled data r based on known scramblers with an unknown scrambling seed s. The system further comprises a memory device in communication with a hardware processor and having stored computer-executable instructions to cause the hardware processor to obtain a predetermined matrix based at least in part on a state transition matrix F of the known scramblers, and determine the unknown scrambling seed s based on a function including the predetermined matrix, segments of a scrambler output sequence f with known initial states, and segments of the scrambled data r.

In another embodiment, the method comprises receiving a radio frequency (RF) signal transmitted between a drone and a controller. The RF signal including scrambled data r based on known scramblers and an unknown scrambling seed s. The method further comprises obtaining by a hardware processor a predetermined matrix based at least in part on a state transition matrix F of the known scramblers; and determining by the hardware processor the unknown scrambling seed s based on a function including the predetermined matrix, segments of a scrambler output sequence f with known initial states, and segments of the scrambled data r.

DETAILED DESCRIPTION

The fast growth of drone applications in industrial, commercial and consumer domains in recent years has caused great security, safety and privacy concerns. For this reason, demand has been growing for systems and technique for drone detection, monitoring, and mitigation.

CUAS systems (or simply "drone detection systems") may operate using multiple stages. In a first stage, the drone detection system detects the presence of a drone and determine whether the drone is a friend or a foe. The drone detection system can accomplish this by eavesdropping the signals exchanged between the drone and the controller. For example, certain aspects of this disclosure may relate to detecting the presence of drones which communicate with the controller using an RF signal including a synchronization signal such as a Zadoff-Chu (ZC) sequence for synchronization of the RF signal.

In certain aspect, the detection of the drone can involve receiving a sequence of samples of an RF signal transmitted between a drone and a drone controller, the RF signal including a synchronization signal for synchronization of the RF signal, obtaining a double differential of the received sequence of samples, calculating a running sum of a defined number of the double differential of the received sequence of samples, and detecting the presence of the drone based on the running sum.

For certain types of synchronization signals (e.g., ZC sequences), by detecting the presence of a drone employing a synchronization signal as described herein, the drone detection system can detect the synchronization signal without knowledge of a root of the synchronization signal. As used herein, the root of these types of synchronization signals generally refers to a unique value that is used to generate and decode the synchronization signals. The use of a unique root can prevent the synchronization signal from interfering with other RF communication signals generated using a different root. Moreover, the drone detection system can be implemented with low-complexity and can be cost effective compared to techniques which run detection in parallel using every possible root value.

Figure 1:
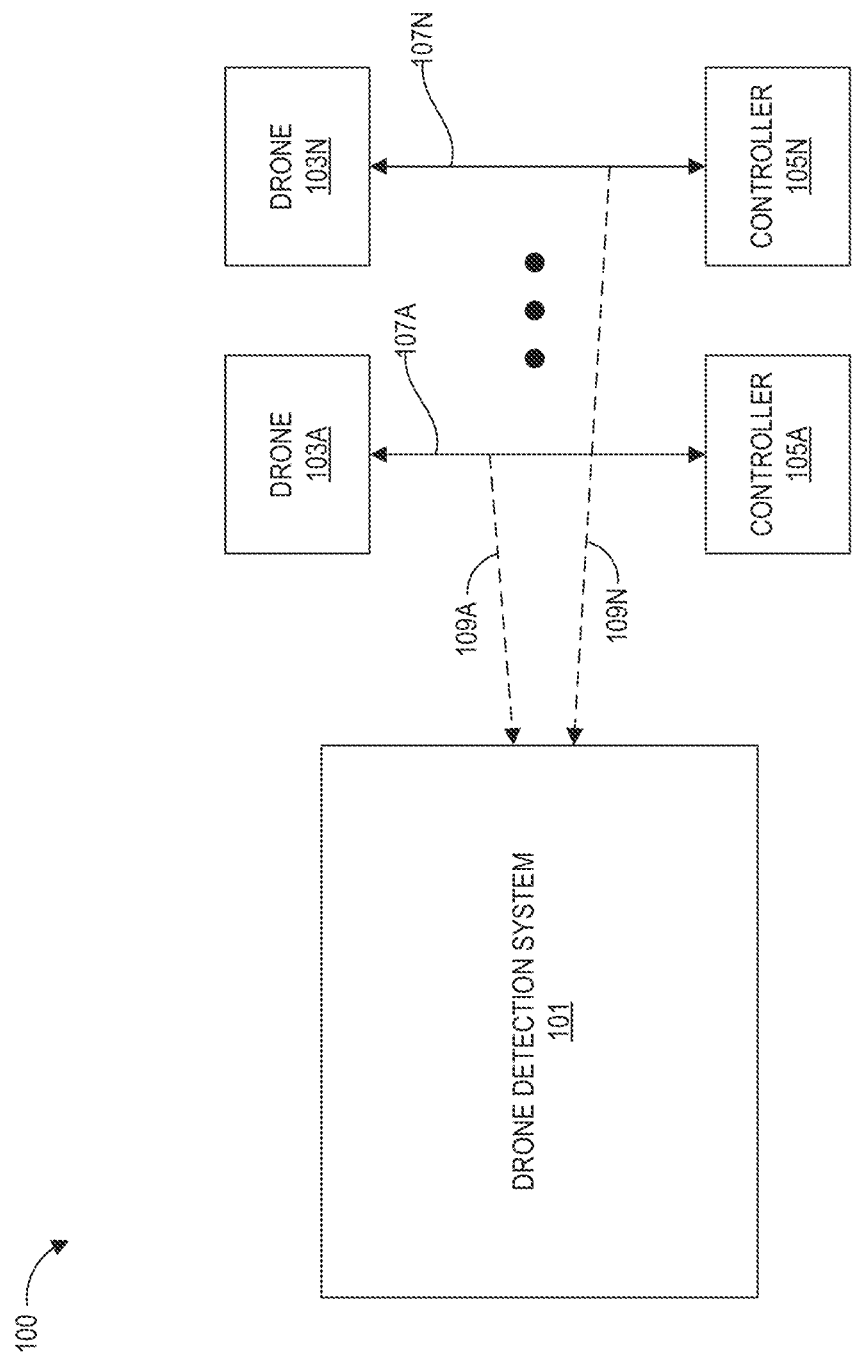
FIG. 1 illustrates an example environment including a drone detection system in accordance with aspects of this disclosure.

FIG. 1 illustrates an example environment 100 including a drone detection system 101 in accordance with aspects of this disclosure. In certain embodiments, the environment 100 includes the drone detection system 101, one or more drones 103A-103N, and one or more drone controllers 105A-105N (or simply "controllers"). An example of the one or more drones 103A-103N is illustrated in FIG. 2B. An example of the one or more controllers 105A-105N is illustrated in FIG. 2C.

In certain embodiments, each of the drones 103A-103N is configured to communicate to a corresponding one of the controllers 105A-105N via an RF signal 107A-107N. Although not illustrated, in some embodiments, a single one of the controllers 105A-105N may be configured to control more than one of the drones 103A-103N.

The drone detection system 101 is configured to receive eavesdrop 109A109N on the communications between the drones 103A-103N and the controllers 105A-105N in order to detect the presence of the drones 103A-103N. For example, the drone detection system 101 may be configured to receive the RF signals 107A-107N being sent between the drones 103A-103N and the controllers 105A-105N in order to eavesdrop 109A-109N on the communication between the drones 103A-103N and the controllers 105A-105N. In certain embodiments, once the drone detection system 101 is able to decode the RF signals 107A107N, the drone detection system 101 may monitor the drones 103A-103N and take certain actions in order to mitigate the potential threat of the drones 103A-103N. For example, the drone detection system 101 may transmit a jamming RF signal to disrupt communication between the detected drone 103A-103N and the controller 105A-105N, and/or spoof the controller 105A-105N by sending a command to the drone 103A103N to land or otherwise leave the environment 100.

I. Introduction

Many of the drone 103A-103N, also known as unmanned aerial vehicles (UAV), in the industrial, commercial, and consumer sectors utilize 3GPP Long-Term Evolution (LTE), modified LTE, or LTE-like wireless protocols for communications between drones and their control devices or controllers 105A-105N such as radio controllers and goggles. In the physical layer (PHY) of these LTE-based drone systems, the baseband processing at the transmitter (TX) includes a scrambler to randomize the channel coded data before modulation, which provides a certain level of security and data privacy in addition to other benefits. A scrambling sequence is typically generated by a linear feedback shift registers (LFSR) with a scrambling seed, also called scrambling offset, to initialize the states of the LFSR. Since the receiver (RX) of the drone systems knows the seed, it can generate the same scrambling sequence to descramble the received data without the need for blind detection. However, the seed is unknown to any device outside the drone systems. Moreover, the scrambling seed is strongly tied to the identification of the drone devices. Detecting the seed assists in decoding important information and revealing the identity of a drone 103A-103N. Therefore, the scrambling seed is essential for counter-unmanned aircraft systems (CUAS) and drone detection/monitoring systems to blindly detect the scrambling seed within critical time constraints. It is a nontrivial task to blindly detect the scrambling seed in real time. In LTE-based drones, the scrambling seed is the combination of two 31-bit Gold sequences generated by two LFSRs of length 31 with one known seed and the other unknown for blind detection. As a result, the unknown seed cannot be determined immediately in real time by any brute-force method because there are 2,147,483,648 ($=2^{31}$) possible choices. Moreover, the seed can change regularly, which poses a strict time limit for seed detection. The blind seed detection can be further complicated by the noise and other channel impairments that may result in bit errors in the received scrambled data. The combining of multiple copies of descrambled data performed by regular RX cannot be directly applied to the noisy scrambled data in order to maximize the received signal-to-noise ratio (SNR) because the received data are randomized by scrambling. The studies on the reconstruction of scrambler LFSR polynomials and initial states including the secret keys of stream ciphers are rich in literature. However, there are only a few solutions capable of handling errors in received bits due to channel noise. A conventional blind scrambling seed estimation scheme using the redundancy introduced by channel coding in the scrambled data may be used. This scheme requires the knowledge of the coding scheme used at the TX (e.g., drone). Further, a method for reconstructing scrambler polynomials from data streams received in the presence of noise. However, this method does not reconstruct scrambler seeds. It is possible to enhance the performance of the foregoing method with the reconstruction of scrambler's initial state. Nevertheless, this enhancement requires a large number of samples and the knowledge of coding knowledge, which may take a long time to run especially when the degree of the polynomials is high.

It is desirable to use an efficient and fast method for blind scrambling seed estimation in noisy channel environment that can meet strict time requirements. Thus, in this disclosure, a blind scrambling seed detection method is described using the soft combining of scrambled repetitive rate matched data to enhance the detection performance in noisy channel. Rate matching is the mechanism specified in LTE standard to place transmitted coded data into the allocated OFDM resources in order to achieve the required data rate. When the transmitted data size is small (e.g. control information or small transport blocks), the interleaved codeword will be placed repeatedly in the resources. Although this repetitive structure disappears after scrambling, it is utilized in one embodiment to soft combine the received data after algebraic manipulations. If the channel coding scheme is known, similar to a blind scrambling seed estimation scheme using the redundancy introduced by channel coding in the scrambled data, the method of this embodiment uses this knowledge to remove the coding effect in the null subspace of coding to reveal the scrambling states. When the coding scheme is unknown, the method in this embodiment utilizes the repetitive structure to remove the effect of transmitted data to facilitate the seed detection. As described below, one point of novelty lies in the algebraic derivations making the soft combining of scrambled data feasible with the rate matching structure. Simulation results show that such seed detection method with coding knowledge significantly improves the detection performance over conventional approaches. This method with no coding knowledge also compensates the performance loss due to the lack of that knowledge. As will be further described herein, the system model for blind detection is provided. Further, the method of blind seed detection with the knowledge of encoding is described. The method of blind seed detection with no knowledge of encoding is also described.

Figure 2A:
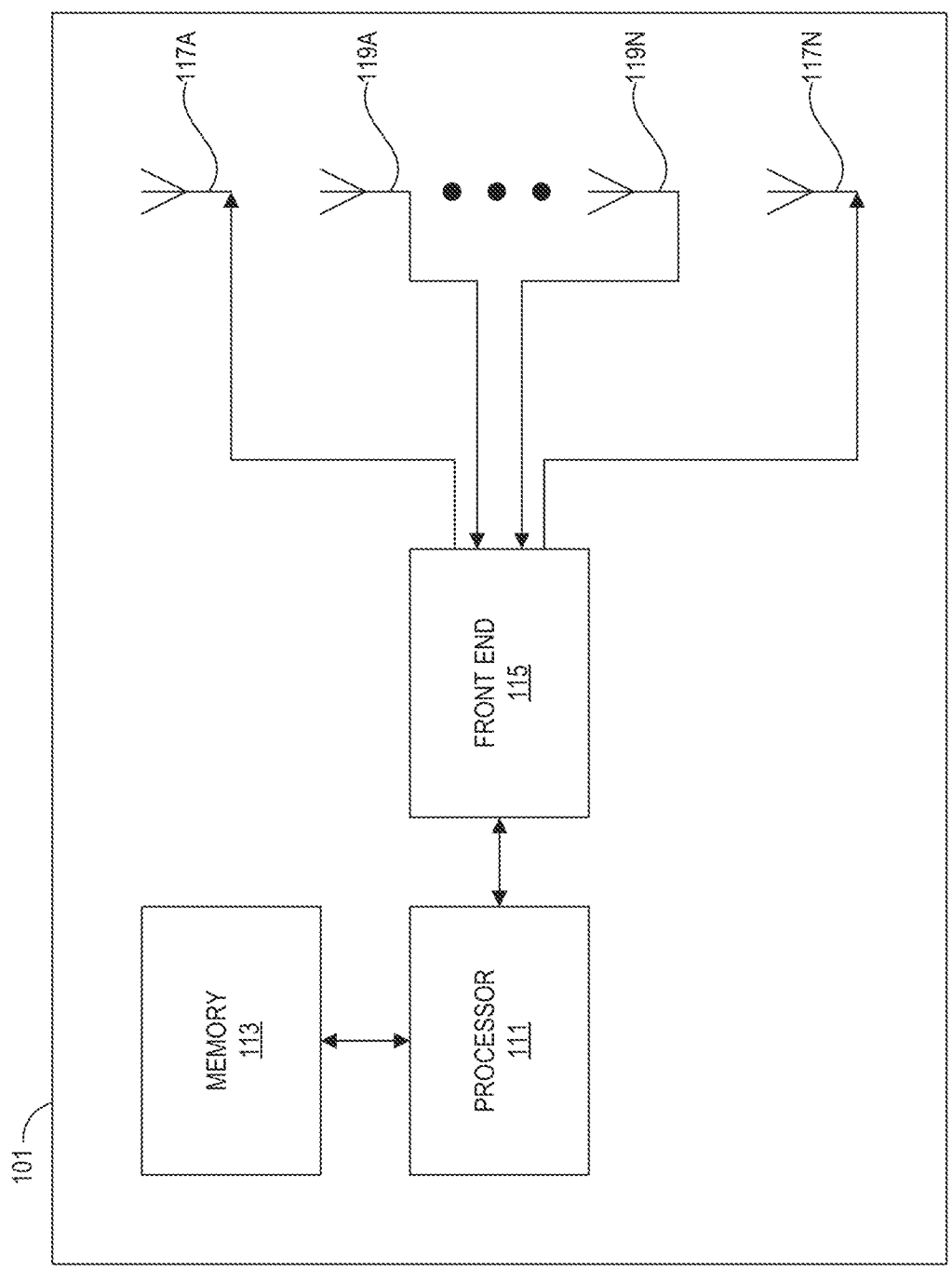
FIG. 2A illustrates an example drone detection system from FIG. 1 which can be used to detect, monitor, and/or mitigate drones in accordance with aspects of this disclosure.
Figure 2B:
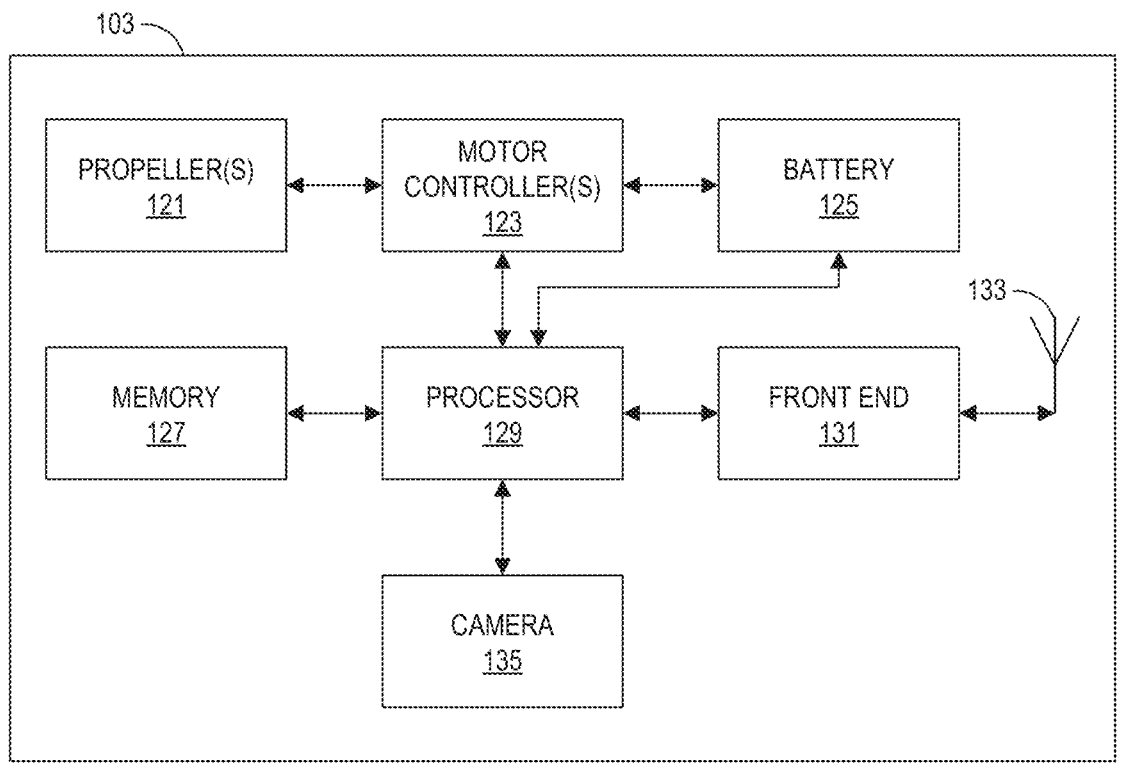
FIG. 2B illustrates an example drone from FIG. 1 which can be detected with the drone detection system of FIG. 2A in accordance with aspects of this disclosure.
Figure 2C:
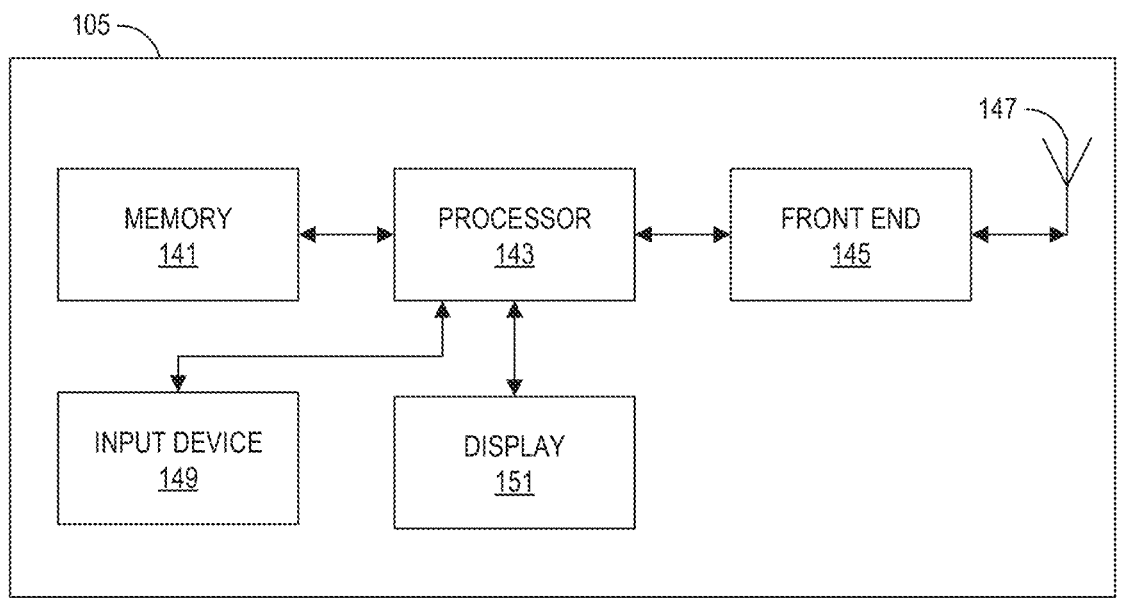
FIG. 2C illustrates an exemplary controller from FIG. 1 which can be used to control the drone in accordance with aspects of this disclosure.

FIG. 2A illustrates an example drone detection system 101 which can be used to detect the presence of the one or more drones 103A-103N in accordance with aspects of this disclosure. In certain embodiments, the drone detection system 101 includes a processor 111, a memory 113, a front end 115, a plurality of transmit antennae 117A-117N, and a plurality of receive antennae 119A-119N. In other embodiments, one or more of the antennae 117A-119N can be used for both transmitting and receiving signals.

In certain embodiments, the drone detection system 101 is configured to receive an RF signal (e.g., the RF signals 107A-107N of FIG. 1) via one of the receive antennae 119A-119N. The one of the receive antennae 119A-119N provides the received RF signal to the front end 115. In certain embodiments, the front end 115 can process the received RF signal into a format that can be read by the processor 111. For example, in certain embodiments, the front end 115 may perform one or more of the following actions: filtering, amplifying, analog-to-digital conversion, etc. on the received RF signal.

In certain embodiments, the memory 113 can store computer readable instructions for causing the processor 111 to detect the presence of a drone (e.g., the drones 103A-103N of FIG. 1) based on the RF signals received via the receive antennae 119A-119N. In addition, in certain embodiments, the drone detection system 101 can also be configured to provide a signal (e.g., a jamming signal or an RF communication signal) to the front end 115 to be transmitted to the detected drone(s). The front end 115 can then process the signal received from the processor 111 before providing the processed signal to one or more of the transmit antennae 117A-117N.

There are a number of different techniques that the drone detection system 101 can use to detect the presence of the drones 103A-103N. For example, the drone detection system 101 can scan the airwaves at frequencies known to be used by particular model(s) of the drones 103A-103N. If a known protocol is identified, the drone detection system 101 can then decode the signal as if it was the intended receiver/controller 105A-105N. Depending on the embodiment, these decoding steps can include: synchronization, channel estimation, de-interleaving, descrambling, demodulation, and error control decoding. In certain embodiments, the drone detection system 101 can be configured to perform some of the aforementioned steps blindly due to lack of knowledge (such as device id) on information known by the controller 105A-105N. As described below, the blind detection of the drones 103A-103N using certain communication protocols (e.g., a synchronization signal) are provided herein. Once detected, the drone detection system 101 can provide alert(s) regarding the presence of the one or more drones 103A-103N.

The drone detection system 101 can monitor the presence of the one or more drones 103A-103N. As part of monitoring, a position of the one or more drones 103A-103N relative to the environment 100 can be monitored in real-time to determine if the position of the one or more drones 103A-103N strays inside or outside acceptable airspace.

FIG. 2B illustrates an example drone 103 which can be detected with the drone detection system 101 in accordance with aspects UAV of this disclosure. In certain embodiments, the drone 103 includes one or more propellers 121, one or more motor controllers 123, a battery or other power source 125, a memory 127, a processor 129, a front end 131, an antenna 133, and a camera 135. As described above, the antenna 133 may be configured to receive RF signals 107 from the controller 105 (see FIG. 2C) and provide RF signals 107 back to the controller 105 (e.g., images obtained from the camera 135). In certain embodiments, the RF signals 107 sent/received from the antenna 133 are provided to/from the processor 129 and processed by the front end 131. In certain embodiments, the propeller(s) 121 provide lift and control movement of the drone 103 as it maneuvers through airspace. The propeller(s) 121 may also include one or more motor(s) (not illustrate) configured to individually power each of the propeller(s) 121.

In certain embodiments, the motor controller(s) 123 are configured to receive instructions from the processor 129 (e.g., based on instructions stored in the memory 127 and the RF signal 107 received from the controller 105) to move the drone 103 to a specific point in the airspace and translate the received instructions into motor position commands which are provided to the propeller(s) 121. In certain embodiments, the battery 125 provides power to each of the components of the drone 103 and has sufficient power storage to enable the propellers 121 to maneuver the drone 103 for a predetermined length of time. The camera 135 can capture images in real-time and provide the captured images to the controller 105 via the antenna 133 which can aid a user in controlling movement of the drone 103.

FIG. 2C illustrates an example controller 105 which can be used to control the drone 103 in accordance with aspects of this disclosure. In certain embodiments, the controller 105 comprises a memory 141, a processor 143, a front end 145, an antenna 147, an input device 149, and a display 151. As described above, the antenna 147 may be configured to receive RF signals 107 (e.g., images obtained from the camera 135) from the drone 103 (see FIG. 2B) and provide RF signals 107 back to the drone 103 to control movement of the drone 103. In certain embodiments, the RF signals 107 sent/received from the antenna 147 are provided to/from the processor 143 and processed by the front end 145. In certain embodiments, the input device 149 is configured to receive input from a user which can be used by the processor 143 to generate commands for controlling movement of the drone 103. In certain embodiments, the display 151 is configured to display images received from the drone 103 to the user to provide feedback on the current position of the drone 103 and its environment. In some embodiments, the display can be implemented as a pair of goggles worn by the user to provide a first person view of images obtained by the camera 135.

II. System Model

Figure 3:
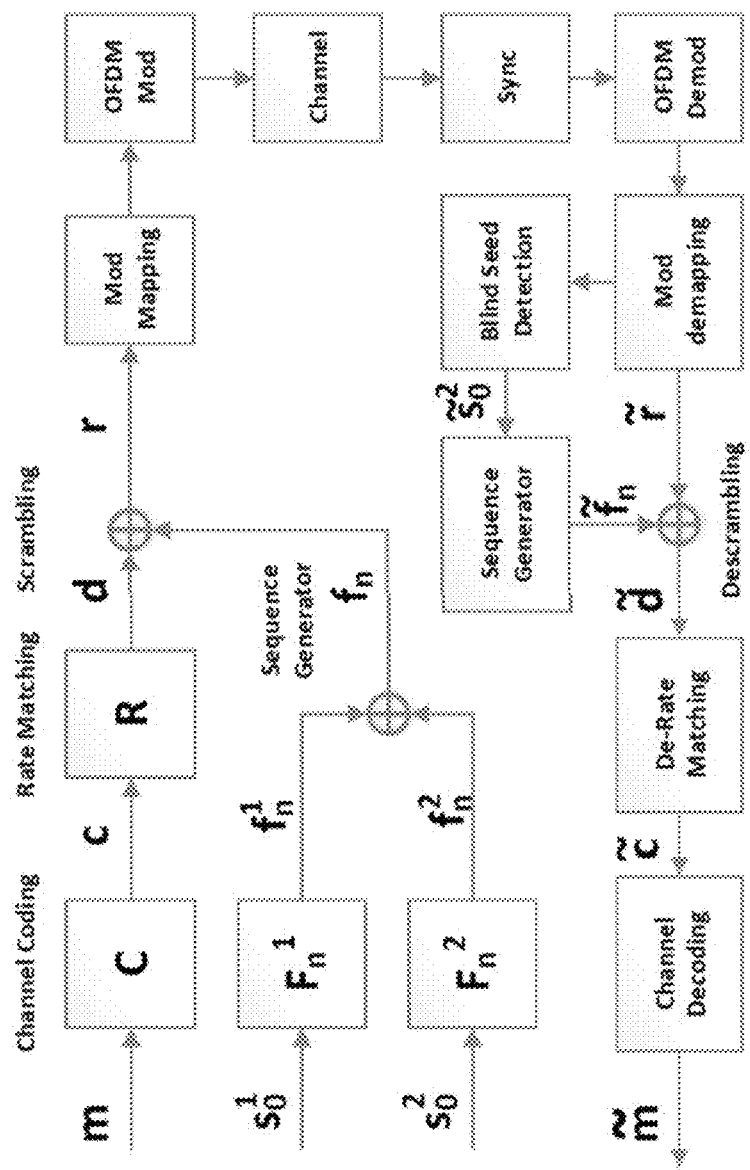
FIG. 3 illustrates an exemplary system model of an LTE-based drone transmitter (TX), an Additive White Gaussian Noise (AWGN) channel, and a CUAS or drone monitoring receiver (RX).

FIG. 3 illustrates an exemplary system model of an LTE-based drone transmitter (TX), an Additive White Gaussian Noise (AWGN) channel, and a CUAS or drone monitoring receiver (RX). The system model considered in this embodiment is shown in FIG. 3. The system includes a transmitter (TX) of an LTE-based drone, an Additive White Gaussian Noise (AWGN) channel, and a CUAS or drone monitoring receiver (RX). Let m be the message for transmission in a fixed time interval T. In LTE-based drones, message m can be control information or transport blocks delivered from Medium Access Control (MAC) layer plus Cyclic Redundancy Check (CRC) bits. m is encoded by linear code such as block code, tail-biting convolutional code or turbo code. The state transition matrix of the channel coder is denoted by C. The construction of C can be found in [3] for the case of convolutional coding. The codeword c=Cm of length c is then rate matched to d=Rc=RCm of length r by rate matching transition matrix R. R can be constructed similarly according to a predefined rate matching process such as Clause 5.1.4 of [2] in 3GPP LTE systems. If R is not known, many reverse engineering methods can be utilized to discover R.

In R, c is typically interleaved to v stored in a circular buffer. The cyclically rotated version of v, denoted by w, is then used repeatedly to fill up the allocated OFDM resources, the rate matching output d of length r. For simplicity, assume that $r=N_r \cdot c$ where $N_r$, assumed to be $\geq 2$ is the number of copies of w in d. That is, $d=[w^T w^T \ldots w^T]^T$. This is a reasonable assumption when message m contains control information or transport blocks of small size. Typically multiple copies of codewords are transmitted to facilitate the decoding in low SNR. Thus, the length of a codeword is much smaller than the size of resources allocated.

The rate matched data d are then scrambled by scrambling sequence f. As in Clause 7.2 of [1], assume that f is the exclusive-OR (addition in Galois Field of two elements denoted by GF(2)) of two L-bit linear feedback shift register (LFSR)-based scrambler outputs starting from state n. The initial state (scrambling seed) and state transition matrix of scrambler i are denoted by $s_0^i$ and $F^i$, respectively, i=1, 2. In this embodiment, assume that $s_0^1$ is known (e.g. as defined in the 3GPP Standard [1]) whereas $s_0^2$ is the seed intended to blindly detect from the received scrambled data. Also, assuming that the polynomials of both scramblers are known (e.g. as defined in [1]), state transition matrices $F^i$ are known and can be easily constructed. Since the scrambling starts from state n, an r by n+r extraction matrix $E_n=[0_{r \times n}\ I_r]$ extracts the sequence from state n to state n+r. Hence, the scrambling sequence of scrambler i from state n to state n+r−1 is $$f_n^i = E_n f_0^i = E_n F^i s_0^i = F_n^i s_0^i \qquad (1)$$

where $F_n^i = E_n F^i$ is the transition matrix of scrambler i starting from state n. The scrambled data r is then given by $$r = d \oplus f_n = RCm \oplus F_0^1 s_0^1 \oplus F_0^2 s_0^2 \qquad (2)$$

where $\oplus$ is the element-wise addition in GF(2).

Scrambled data r are then mapped to data symbols followed by the modulation on OFDM subcarriers. The OFDM modulated signal x is sent through the channel. The received signal y at the receiver is given by $$y = hx + n \qquad (3)$$

where h is channel gain and $n \sim (0, \sigma^2)$ is circularly complex additive white Gaussian noise (AWGN) with variance $\sigma^2$. After OFDM demodulation and modulation demapping, the received scrambled bits, $\tilde{r}$ are obtained. For blind detection, $\tilde{r}$ are typically obtained in the form of log-likelihood ratio (LLR), denoted by $(\tilde{r})_{llr}$ by soft modulation demapping. If the unknown scrambling seed $s_0^2$ is correctly detected and $\tilde{r}=r$, message m can be successfully decoded after descrambling and de-rate matching.

Figure 4:
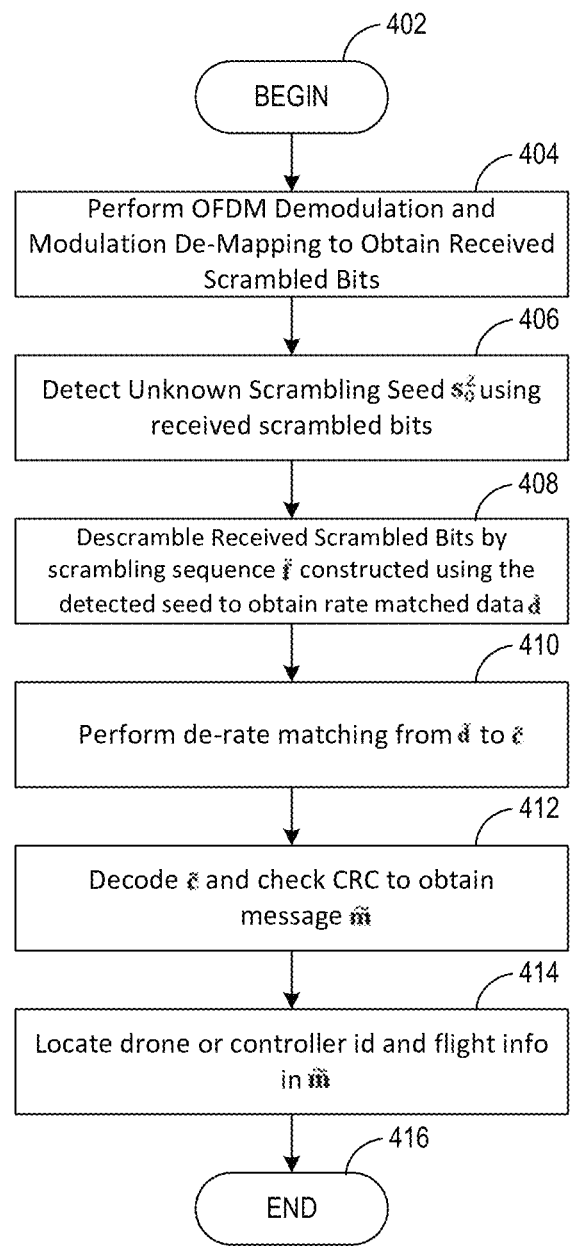
FIG. 4 illustrates a method for blind detection of a scrambling seed of a LTE-based drone in accordance with one embodiment of the invention.

FIG. 4 illustrates a method for blind detection of a scrambling seed of a LTE-based drone in accordance with one embodiment of the invention. In FIG. 4, a summary of the method of blind detection based on the system model of FIG. 3 is provided. Thus, the details described in connection with the system model of FIG. 4 apply equally to the method described in connection with FIG. 4. As shown in FIG. 4, the process begins at block 402. As noted above, the system of the model includes a transmitter (TX) of an LTE-based drone, an Additive White Gaussian Noise (AWGN) channel, and a CUAS or drone monitoring receiver (RX). At block 404, the method involves performing OFDM demodulation and modulation de-mapping to obtain received scrambled bits. At block 406, the method involves detecting unknown scrambling seed $\tilde{s}_0^2$ using received scrambled bits. At block 408, method involves descrambling received scrambled bits by scrambling sequence $\tilde{f}$ constructed using the detected seed to obtain rate matched data $\tilde{d}$. At block 410, the method involves performing de-rate matching from $\tilde{d}$ to $\tilde{c}$. At block 412, the method involves decoding $\tilde{c}$ and check CRC to obtain message $\tilde{m}$. At block 414, the method involves locating drone or controller id and flight info in $\tilde{m}$. The method concludes at block 416.

III. Blind Scrambling Seed Detection with the Knowledge of Coding

In this section, a blind scrambling seed detection method is described to soft combine the scrambling seeds using the repetitive rate matched structure in the received scrambled data with the knowledge of the channel encoding scheme. The described method can significantly improve the detection performance over the non-combining and the hard combining approaches.

A. Blind Scrambling Seed Detection in Noise-Free Channel

Figure 5:
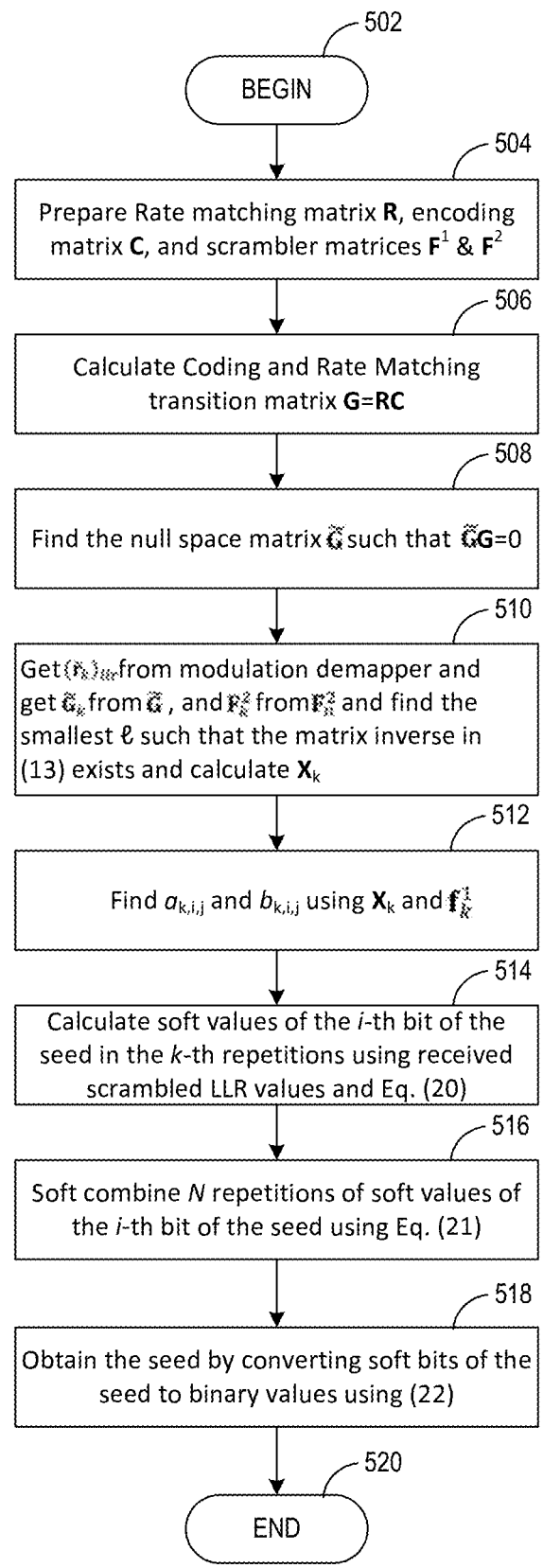
FIG. 5 illustrates a method for blind detection of a scrambling seed with knowledge of the coding scheme in accordance with one embodiment of the invention.

FIG. 5 illustrates a method for blind detection of a scrambling seed with knowledge of the coding scheme in accordance with one embodiment of the invention. This method begins at block 502. When there is no noise (e.g., the SNR of received signals is sufficiently high such that all scrambled bits are received correctly) and channel gain is constant, $\tilde{r}=r$ and scrambling seed $s_0^2$ can be blindly detected using the approach modified from [3] with the addition of rate matching matrix R, scrambler matrix $F_n^1$, and seed $s_0^1$. Thus, at block 504, the method involves preparing rate matching matrix R, encoding matrix C, and scrambler matrices $F^1$ and $F^2$. At block 506, the method involves calculating coding and rate matching transition matrix G=RC. Further, $\tilde{G}$ can be defined as a matrix whose rows span the null subspace of G such that $\tilde{G}G=0$. At block 508, the method involves finding the null space matrix $\tilde{G}$ such that $\tilde{G}G=0$.

Eq. (2) can be re-arranged as $$F_n^2 s_0^2 = r \oplus F_n^1 s_0^1 \oplus Gm \qquad (4)$$

Consider left-multiplying Eq. (4) by $\tilde{G}$ and using $\tilde{G}G=0$, to obtain $$\tilde{G}F_n^2 s_0^2 = \tilde{G}(r \oplus F_n^1 s_0^1) \oplus \tilde{G}Gm \qquad (5)$$

$$= \tilde{G}(r \oplus f_n^1) \qquad (6)$$

If both sides of Eq. (6) are multiplied by $(\tilde{G}F_n^2)^T$, and $(\tilde{G}F_n^2)^T \tilde{G}F_n^2$ is invertible, then $s_0^2$ can be uniquely obtained as $$s_0^2 = ((\tilde{G}F_n^2)^T \tilde{G}F_n^2)^{-1} (\tilde{G}F_n^2)^T \tilde{G}(r \oplus f_n^1) \qquad (7)$$

Eq. (7) can only be used when $\tilde{r}=r$, that is, all scrambled bits are received correctly.

On the other hand, when any bit in $\tilde{r}$ received in error, $\tilde{r} \neq r$ in a noisy channel. In this case, if $(\tilde{G}F_n^2)^T \tilde{G}F_n^2$ is still invertible, Eq. (7) becomes $$\tilde{s}_0^2 = ((\tilde{G}F_n^2)^T \tilde{G}F_n^2)^{-1} (\tilde{G}F_n^2)^T \tilde{G}(\tilde{r} \oplus f_n^1) \neq s_0^2. \qquad (8)$$

Thus, an incorrect seed is obtained from Eq. (8) if any bit is received in error. This problem will be addressed by the description of the method in Section III-B below. Another issue with this approach is that when the type of encoder used at the transmitter is unknown, C cannot be constructed to find the null subspace $\tilde{G}$ of G=RC. This issue will be solved by the method described in Section IV.

B. Blind Scrambling Seed Detection in Noisy Channel

When the received scrambled data contain errors, it is desirable to exploit the repetitive rate matching structure. Eq. (2) can be rearranged to $d=r\oplus f$ and obtain $$d=r\oplus F_n^1 s_0^2 \oplus F_n^2 s_0^2 \qquad (9)$$

Let $r_k$ and $d_k$ be the $\ell$-bit segment k of the scrambled data r and unscrambled data d, respectively, starting from bit kc to bit kc+$\ell$−1, c≤$\ell$≤2c. Note that $d_k$=w and N=$N_r$ if $\ell$=c, where N is the number of repetitive segments for combining. $d_k=[w^T w_0 \ldots w\ell_{-c-1}]^T$ and N=$N_r$−1 if c<$\ell$≤2c, where $w_j$ is the j-th bit of w. From the repetitive structure in d, it is established that $$d_0=d_1=d_2=\ldots=d_{(N-1)} \qquad (10)$$

With a slight abuse of notations, let $F_k^i$ and $f_k^i$, i=1, 2 be the state transition matrix and the output sequence, respectively, of the scrambler i starting from the state n+kc to n+kc+$\ell$−1. If $\tilde{r}_k=r_k$, for descrambling $r_k$ to $d_k$, k=0, 1, . . . , N−1, this provides $$d_k=r_k\oplus F_k^1 s_0^1 \oplus F_k^2 s_0^2, k=0,1,\ldots,N-1. \qquad (11)$$

Recognize $d_k=R_k$Cm where $R_k$ is the rate matching transition matrix from state kc to kc+$\ell$−1. Let $G_k=R_k$C be the combined coding and rate matching matrix from state kc to kc+$\ell$−1. $\tilde{G}_k$ can be defined as the null subspace matrix of $G_k$, such that $\tilde{G}_k G_k=0$, k=0, 1, . . . , N−1. Similar to Eq. (6), multiply Eq. (11) by $\tilde{G}_k$ and obtain $$\tilde{G}_k F_k^2 s_0^2 = \tilde{G}_k(r_k\oplus f_k^1), k=0,1,\ldots,N-1. \qquad (12)$$

Multiplying both sides of Eq. (12) by $(\tilde{G}_k F_k^2)^T$, and finding the smallest $\ell$ such that the inverse of $(\tilde{G}_k F_k^2)^T \tilde{G}_k F_k^2$ exists, then $$s_{0,k}^2 = X_k(r_k \oplus f_k^1) \qquad (13)$$

where $X_k=((\tilde{G}_k F_k^2)^T \tilde{G}_k F_k^2)^{-1}(\tilde{G}_k F_k^2)^T \tilde{G}_k$. All seeds detected from each segment of received data $s_{0,k}^2$ are identical and correct. This is, $s_{0,0}^2 = \ldots = s_{0,N-1}^2 = s_0^2$. However, if $\tilde{r}_k \neq r_k$ due to noise, $s_{0,k}^2 \neq s_0^2$. Fortunately, the errors in $\tilde{r}_k$ occur independently. To mitigate the effect of receiving errors for seed detection, it is desirable to soft combine all detected seeds using the received scrambled data. At block 510, the method involves getting $\tilde{G}_k$ from $\tilde{G}$, and $F_k^2$ from $F_n^2$, and finding the smallest $\ell$ such that the matrix inverse in (13) exists and calculating $X_k$.

The received scrambled data $\tilde{r}_k$ are typically obtained in real-valued LLR form, $(\tilde{r}_k)_{llr} \in \mathcal{R}^\ell$, after modulation demapping. Since the scrambled data cannot be combined directly, it is desirable to derive the seed estimate in terms of the LLR values of received scrambled data for each segment. Then the seed estimates of all segments can be soft combined. To facilitate the soft combining, it is desirable to first introduce the following definitions to convert binary values to soft values, and vice versa.

Definition 1: For a binary bit x∈{0, 1}, the soft bit of x, denoted by $\mathfrak{L}$(x), is defined as y=$\mathfrak{L}$(x)=1.0−2.0·x, y∈{+1.0,−1.0}⊂$\mathcal{R}$.

Definition 2: For any y∈$\mathcal{R}$, the binary value of y is defined as x=$\mathfrak{L}^{-1}$(y)=$\mathbb{I}${y<0}, x∈{0, 1}, where $\mathbb{I}${z} is an indicator function and returns 1 if z is true, 0 otherwise.

Definition 3: For a binary vector x of length n, x∈{0, 1}$^n$, the soft vector of x, denoted by $\mathfrak{L}$(x), is defined as y=$\mathcal{R}^\ell$(x)=1.0−2.0·x, y∈{+1.0,−1.0}$^n$.

Definition 4: For real-valued vector y of length n, y∈$\mathcal{R}^n$, the binary vector of y is defined as x=$\mathfrak{L}^{-1}$(y)=[$\mathfrak{L}^{-1}$(y$_0$) $\mathfrak{L}^{-1}$(y$_1$) . . . $\mathfrak{L}^{-1}$(y$_{n-1}$)]$^T$=[$\mathbb{I}${y$_0$<0} $\mathbb{I}${y$_1$<0} . . . $\mathbb{I}${y$_{n-1}$<0}]$^T$=$\mathbb{I}${y<0}, x∈{0, 1}$^n$, where $\mathbb{I}${z} is an element-wise indicator function and, for reach element $z_i$ of z, returns 1 if $z_i$ is true, 0 otherwise, i=0, 1, . . . , ||z||−1.

Definition 1 simply maps {0, 1} to {+1.0,−1.0}. Definition 2 maps {$\mathcal{R}^+ \cup$ {0}, $\mathcal{R}^-$} to {0, 1} where $\mathcal{R}^+$ and $\mathcal{R}^-$ are positive real numbers and negative real numbers, respectively. Note that y=0 will be mapped to binary 0 according to Definition 2 though the mapping to 0 or 1 is arbitrary. Definition 3 and Definition 4 are vector versions of Definition 1 and Definition 2, respectively. Next, it is desirable to introduce Lemma 1 for algebraic manipulation between GF(2) and $\mathcal{R}$ as follows:

Lemma 1: For $a_0, a_1, \ldots, a_{N-1} \in$ {0, 1}, $\mathfrak{L}(\oplus_{i=0}^{N-1} a_i) = \Pi_{i=0}^{N-1} \mathfrak{L}(a_i)$.

Proof: See Appendix A.

Lemma 2: For binary vectors $a_0, a_1, \ldots, a_{N-1} \in$ {0, 1}$^n$, $\mathfrak{L}(\oplus_{i=0}^{N-1} a_i) = \Pi_{i=0}^{N-1} \mathfrak{L}(a_i)$ where $\oplus$ and $\Pi$ are element-wise addition in GF(2) and element-wise multiplication in $\mathcal{R}$ R respectively.

Proof: The proof is similar to Appendix A.

Lemma 1 states that, for binary data $a_i$, i=0, 1, . . . , N−1, the soft value of the addition of $a_i$ in GF(2) equals the product soft values of $a_i$, $\mathfrak{L}(a_i)$. Lemma 2 is the vector version of Lemma 1.

Using Definition 3 and replacing $r_k$ with $\tilde{r}_k$, Eq. (13) may be converted to soft estimates as $$\mathfrak{L}(s_{0,k}^2) = \mathfrak{L}(X_k(\tilde{r}_k \oplus f_k^1)), k=0,1,\ldots,N-1. \qquad (14)$$

where $X_k$ is an L by $\ell$ matrix as defined in Eq. (13), $\tilde{p}_k \tilde{r}_k \oplus f_k^1 = [\tilde{p}_{k,0} \ldots \tilde{p}_{k,\ell-1}]^T$ is a column vector of length $\ell$, and $\tilde{p}_{k,j} = \tilde{r}_{k,j} \oplus f_{k,j}^1$, j=0, 1, . . . , $\ell$−1. From Eq. (14), the soft value of the i-th bit of $s_{0,k}^2$, i=0, 1, . . . , L−1, is given by $$\mathfrak{L}(\tilde{s}_{k,i}) = \mathfrak{L}(x_{k,i}(\tilde{r}_k \oplus f_k^1)) \qquad (15)$$

$$= \mathfrak{L}(\oplus_{j=0}^{\ell-1} x_{k,i,j}(\tilde{r}_{k,j} \oplus f_{k,j}^1)) \qquad (16)$$

$$= \Pi_{j=0}^{\ell-1} \mathfrak{L}(x_{k,i,j}(\tilde{r}_{k,j} \oplus f_{k,j}^1)) \qquad (17)$$

$$= \Pi_{j=0}^{\ell-1} \mathfrak{L}((x_{k,i,j}\tilde{r}_{k,j}) \oplus (x_{k,i,j}f_{k,j}^1)) \qquad (18)$$

$$= \Pi_{j=0}^{\ell-1} \mathfrak{L}((x_{k,i,j}f_{k,j}^1) \oplus (x_{k,i,j}\tilde{r}_{k,j})) \qquad (19)$$

where $x_{k,i}=[x_{k,i,0} \ldots x_{k,i,\ell-1}]$ is the i-th row vector of $X_k$. The equality in Eq. (17) and in (19) follow Lemma 1. To further simplify Eq. (19), it is desirable to introduce the expression for the soft value of the AND function of the two binary bits in Lemma 3.

Lemma 3: For x, y∈{0, 1}, the soft value of x multiplied by y in GF(2), equivalently, the soft value of the logical AND of x and y is $\mathfrak{L}$(xy)=(−1)$^{\bar{x}y}\mathfrak{L}$(y) where $\bar{x}=x\oplus 1$ is the logical complement of x.

Proof: See Appendix B.

Applying Lemma 3 to Eq. (19), then $$\mathfrak{L}(\tilde{s}_{k,i}) = \Pi_{j=0}^{\ell-1} a_{k,i,j}(b_{k,i,j})^{\tilde{r}_{k,j}} \mathfrak{L}(\tilde{r}_{k,j}) \qquad (20)$$

where $a_{k,i,j}=\mathfrak{L}(x_{k,i,j}f_{k,j}^1)$ and $b_{k,i,j}=(-1)^{\tilde{x}_{k,i,j}}$. Here, $x_{k,i,j}$ and $f_{k,j}^1$ are known in advance because the coding and scrambling transition matrices are know. $\tilde{r}_{k,j}$, on the other hand, depends on received scrambled LLR values $(\tilde{r}_k)_{llr}=[(\tilde{r}_{k,0})_{llr}$ $(\tilde{r}_{k,1})_{llr} \ldots (\tilde{r}_{k,\ell-1})_{llr}]^T$. At block 512, the method involves finding $a_{k,i,j}$ and $b_{k,i,j}$ using $X_k$. At block 514, the method involves calculate soft values of the i-th bit of the seed in the k-th repetitions using received scrambled LLR values and Eq. (20). For soft combining, it is desirable to replace $\mathfrak{L}(\tilde{r}_{k,j})$ with $(\tilde{r}_{k,j})_{llr}$ and $\tilde{r}_{k,j}$ with $\mathfrak{L}^{-1}((\tilde{r}_{k,j})_{llr})$ in Eq. (20), and obtain the soft combined estimate of the i-th bit of $s_0^2$, i=0, 1, ..., L−1, using all N repetitions given by $$\mathfrak{L}(\tilde{s}_i) = \sum_{k=0}^{N-1} \Pi_{j=0}^{\ell-1} a_{k,i,j}(b_{k,i,j})^{g \cdot ((\tilde{r}_k,j)_{llr})}(\tilde{r}_k,j)_{llr} \qquad (21)$$

At block 516, the method involves softly combining N repetitions of soft values of the i-th bit of the seed using Eq. (21). Finally, the i-th bit of the scrambling seed estimate $s_0^2$, i=0, 1, ..., L−1, is obtained as $$\tilde{s}_i = \mathfrak{L}^{-1}\left(\Sigma_{k=0}^{N-1} \Pi_{j=0}^{\ell-1} a_{k,i,j}(b_{k,i,j})^{g \cdot ((\tilde{r}_k,j)_{llr})}(\tilde{r}_k,j)_{llr}\right) \qquad (22)$$

where $a_{k,i,j}=\mathfrak{L}(x_{k,i,j}f_{k,j}^1)$, $b_{k,i,j}=(-1)^{\tilde{x}_{k,i,j}} \cdot x_{k,i,j}$ is the element at the i-th row and j-th column of $X_k$, and $f_{k,j}^1$ and $(\tilde{r}_{k,j})_{llr}$ are the j-th element of $f_k^1$ and $(\tilde{r}_k)_{llr}$, respectively. The scrambling seed estimate using soft combining is $\tilde{s}_0^2 = [\tilde{s}_0 \ldots \tilde{s}_{L-1}]^T$. At block 518, the method involves obtain the seed by converting soft bits of the seed to binary values using (22). The method concludes at block 520.

IV. Blind Scrambling Seed Detection with No Knowledge of Coding

Figure 6:
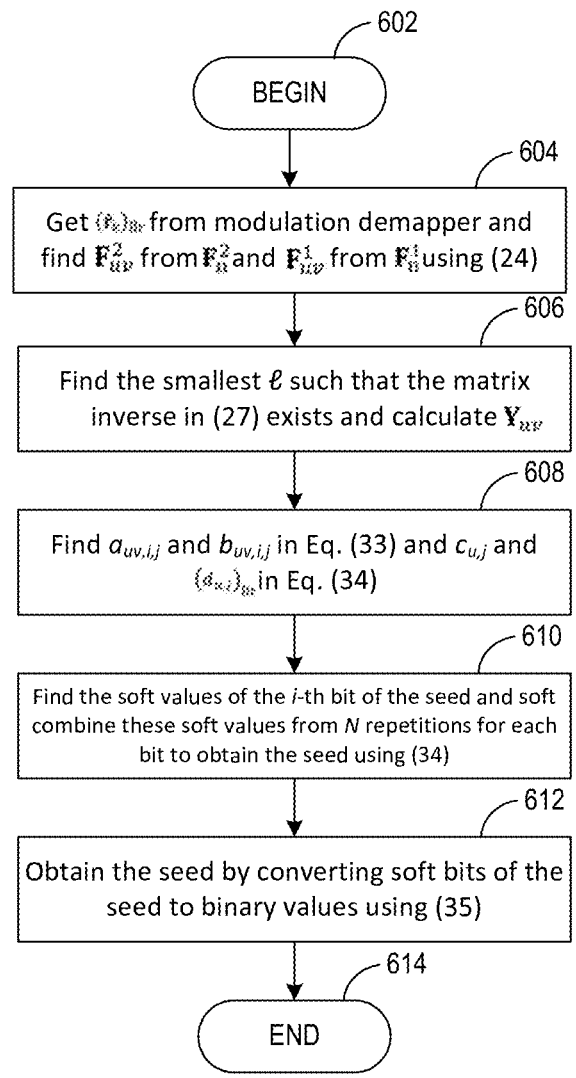
FIG. 6 illustrates a method for blind detection of a scrambling seed with no knowledge of the coding scheme in accordance with one embodiment of the invention.

In this section, a blind scrambling seed detection method is described utilizing the underlying repetitive structures in the received data without the prior knowledge of the channel encoding scheme. FIG. 6 illustrates a method for blind detection of a scrambling seed with no knowledge of the coding scheme in accordance with one embodiment of the invention. The method begins at block 602, and both noise-free and noisy channel conditions are considered in this embodiment. At block 604, the rate matched codeword $d_k$ is expressed from Eq. (11), which provides $$d_k = r_k \oplus F_k^1 s_0^1 \oplus F_k^2 s_0^2, k=0,1,\ldots,N-1 \qquad (23)$$

It is desirable to first look at the noise-free case. If one adds two of these equations in GF(2), say k=u and k=v, u≠v, and using $d_u \oplus d_v = 0$ based on Eq. (10), the following equation is obtained $$F_{uv}^2 s_0^2 = r_{uv} \oplus F_{uv}^1 s_0^1. \qquad (24)$$

where $F_{uv}^t = F_u^t \oplus F_v^t$, t∈{1, 2}, and $r_{uv}=r_u \oplus r_v$. Since $F_{uv}^2$, $r_{uv}$, $F_{uv}^1$ and $s_0^1$ are known, if the smallest value of $\ell$ can be found as noted in block 606 such that the inverse of $(F_{uv}^2)^T F_{uv}^2$ exists, $s_0^2$ can be obtained as follows:

$$s_0^2 = ((F_{uv}^2)^T F_{uv}^2)^{-1} F_{uv}^{2T*}(r_{uv} \oplus F_{uv}^1 s_0^1) \qquad (25)$$

Similar to Eq. (7), Eq. (25) can only be used when $\tilde{r}_k = r_k$, that is, all scrambled bits are received correctly. If $\tilde{r}_k \neq r_k$ (e.g., in a noisy channel), Eq. (23) becomes $$\tilde{d}_k = \tilde{r}_k \oplus F_k^1 s_0^1 \oplus F_k^2 s_0^2 \neq d_k. \qquad (26)$$

For k=u, v, u≠v, $\tilde{d}_u \oplus \tilde{d}_v \neq 0$ if any bit in $\tilde{r}_u$ or $\tilde{r}_v$ is received in error. Thus, both Eq. (24) and Eq. (25) are invalid.

For the noisy case, it is desirable to soft combine all detected seeds from each pair of rate matching repetitions using the received scrambled data as noted in block 608. Similar to the derivations in Section III, from Eq. (25), the soft value of $s_0^2$ estimate is $$\mathfrak{L}(\tilde{s}_0^2) = \mathfrak{L}(Y_{uv}(\tilde{r}_{uv} \oplus f_{uv}^1)) \qquad (27)$$

where $Y_{uv}=((F_{uv}^2)^T F_{uv}^2)^{-1}(F_{uv}^2)^T$, $\tilde{r}_{uv}=\tilde{r}_u \oplus \tilde{r}_v$, $f_{uv}^1=f_{uv}^1 s_0^1$. From Eq. (27), the soft estimate of the i-th bit of $s_{0,uv}^2$, the addition of repetitions u and v in GF(2), i=0, 1, . . . L−1, is given by $$\mathfrak{L}(\tilde{s}_{uv,i}) = \mathfrak{L}(y_{uv,i}(\tilde{r}_{uv} \oplus f_{uv}^1))) \qquad (28)$$

$$= \mathfrak{L}(\oplus_{j=0}^{\ell-1} y_{uv,i,j}(\tilde{r}_{uv,j} \oplus f_{uv,j}^1)) \qquad (29)$$

$$= \Pi_{j=0}^{\ell-1} \mathfrak{L}(y_{uv,i,j}(\tilde{r}_{uv,j} \oplus f_{uv,j}^1)) \qquad (30)$$

$$= \Pi_{j=0}^{\ell-1} \mathfrak{L}(y_{uv,i,j}\tilde{r}_{uv,j})\mathfrak{L}(y_{uv,i,j} \oplus f_{uv,j}^1) \qquad (31)$$

$$= \Pi_{j=0}^{\ell-1} a_{uv,i,j}(b_{uv,i,j})^{\tilde{r}_{uv,j}}\mathfrak{L}(\tilde{r}_{uv,j}) \qquad (32)$$

$$= \Pi_{j=0}^{\ell-1} a_{uv,i,j}(b_{uv,i,j})^{\tilde{r}_{u,j}\oplus \tilde{r}_{v,j}}\mathfrak{L}(\tilde{r}_{u,j})\mathfrak{L}(\tilde{r}_{v,j}) \qquad (33)$$

where $y_{uv,i}=[y_{uv,i,0} \ldots y_{uv,i,\ell-1}]^T$ is the i-th row vector of $Y_{uv}$, $a_{uv,i,j}=\mathfrak{L}(y_{uv,i,j}f_{uv,j}^1)$, $b_{uv,i,j}=(-1)^{\tilde{y}_{uv,i,j}}$, $\tilde{r}_{uv,j}=\tilde{r}_{u,j}\oplus\tilde{r}_{v,j}$. Here again the equality in Eqs. (29), (31), and (33) follow lemma 1. Note that Eq. (32) follows Lemma 3 and has the same form as Eq. (20). Similar to Eq. (21), $y_{uv,i,j}$ and $f_{uv,j}^1$ are known in advance, and $\tilde{r}_{k,j}$ depends on $(\tilde{r}_k)_{llr}$, ∀k.

At block 610, it is desirable to choose the pairs of repetitions for soft combining. There are many ways to choose the pairs of repetitions for soft combining. Let's simply let v=u+1, replace $\mathfrak{L}(\tilde{r}_{k,j})$ with $(\tilde{r}_{k,j})_{llr}$, and $\tilde{r}_{k,j}$ with $\mathfrak{L}^{-1}((\tilde{r}_{k,j})_{llr})$ in Eq. (33), sum over all $N=N_r-1$ repetitions, and obtain the soft combined estimate of the i-th bit of $s_0^2$, i=0, 1, . . . L−1, given by $$\mathfrak{L}(\tilde{s}_i) = \Sigma_{u=0}^{N-1}\Pi_{j=0}^{\ell-1} a_{uu+1,i,j}(b_{uu+1,i,j})^{c_{u,j}}(d_{u,j})_{llr} \qquad (34)$$

where $c_{u,j}=\mathfrak{L}^{-1}((\tilde{r}_{u,j})_{llr})\oplus\mathfrak{L}^{-1}((\tilde{r}_{u+1,j})_{llr})$, and $(d_{u,j})_{llr}=(\tilde{r}_{u,j})_{llr}(\tilde{r}_{u+1,j})_{llr}$. Finally, as noted in block 612, the i-th bit of the scrambling seed estimate $\tilde{s}_0^2$ is obtained as $$\tilde{s}_i = \mathfrak{L}^{-1}(\Sigma_{u=0}^{N-1}\Pi_{j=0}^{\ell-1}\mathfrak{L}^{-1}a_{uu+1,i,j}(b_{uu+1,i,j})^{c_{u,j}}(d_{u,j})_{llr}). \qquad (35)$$

The scrambling seed estimate using soft combining is $\tilde{s}_0^2=[\tilde{s}_0 \ldots \tilde{s}_{L-1}]^T$. The method 600 ends at block 614.

V. Simulation Results

In this section, the performance of the described blind scrambling seed detection method is evaluated using Monte Carlo simulations with 10,000 iterations for each setting. The performance of the described method is compared to that of the hard combining approach and the conventional approach with no combining specified in [3] first with the knowledge of coding and then with no knowledge of coding.

A. Simulation Environment Settings

In each iteration, the message bits of length 20 are randomly generated and coded by the tail-biting convolutional codes. The 60-bit codeword is then rate matched to 720 bits ($N_r$=12) or 1440 bits ($N_r$=24). These rate matched bits are first scrambled with a randomly selected seed $s_0^2$ and mapped to QPSK symbols by modulation mapping. The convolutional coding and rate matching follow the procedures specified in [2]. The scrambling and modulation mapping follow [1]. The QPSK symbols are then placed in equally spaced OFDM resources modulating subcarriers at specific locations of certain OFDM symbols. The rest of subcarriers are modulated by random data symbols. This arrangement of QPSK symbols in OFDM resources is similar to how the control information of certain consumer drones is placed in the resource elements (RE) for 10 MHz and 20 MHz channel bandwidths. The OFDM modulator then converts these frequency-domain symbols with guard band into time-domain samples by Inverse Fast Fourier Transform (IFFT) of size 1,024, add cyclic prefix (CP), and outputs the OFDM signals from TX to the channel where AWGN is added with variance $\sigma^2$ to achieve the required SNR. The received signal at RX is first synchronized and demodulated by the OFDM demodulator. The QPSK symbols that carry the message are extracted from specific subcarrier locations of certain OFDM symbols. After modulation demapping, the LLR values of the scrambled data, $(\tilde{r})_{llr}$, are sent to blind seed detector for detection. If the detected seed $\tilde{s}_0^2$ is the same as the one randomly selected at TX, $s_0^2$, the detection is successful, which can be verified by the recovered message $\tilde{m}$ after descrambling using the detected seed, de-rate matching and decoding.

B. Hard Combining Vs. Soft Combining

Figure 7:
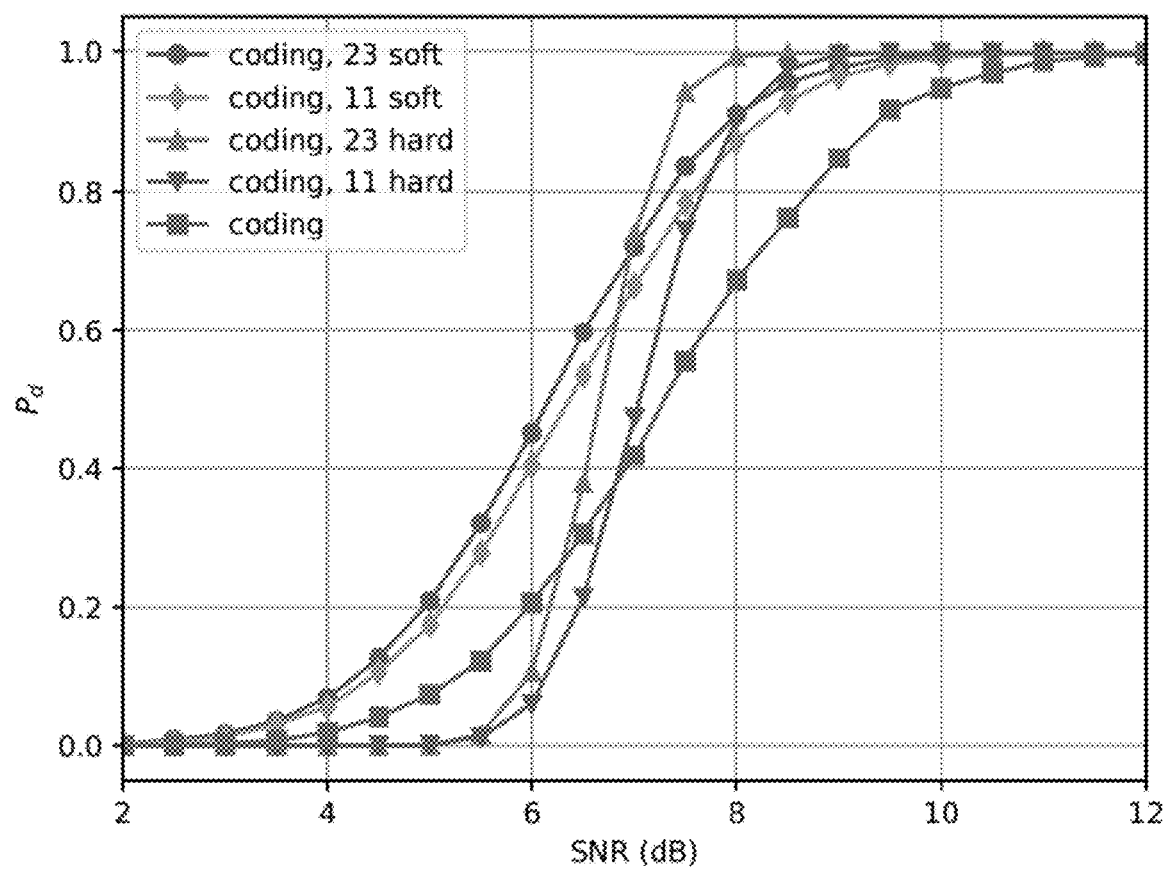
FIG. 7 is a graph which compares blind seed detection of soft, hard, and no combining with the knowledge of coding scheme.

For performance comparison, the described soft combining approach with hard combining with the knowledge of coding are compared. For hard combining, let $\tilde{s}_{k,i}$ be the i-th bit of $\tilde{s}_{0,k}^2$, i=0, 1, ... L−1. Choosing N to be an odd number and using Definitions 1 & 2, the hard combining of bit i of detected seeds is given by $$\tilde{s}_i = \mathfrak{Q}^{-1}(\Sigma_{k=0}^{N-1} \ell(\tilde{s}_{k,i})), i=0,1, \ldots L-1. \quad (36)$$

and the hard combined seed is $\tilde{s}_{0,HC}^2 = [\tilde{s}_0 \tilde{s}_1 \ldots \tilde{s}_{L-1}]^T$. Here, Eq. (36) represents essentially the hard combining of $\tilde{s}_{k,i}$ in $\tilde{s}_{0,k}^2$, $\forall i$ using the majority rule. It can be shown that, if N is an odd number, $\tilde{s}_i$ is j if at least $$\frac{N+1}{2} s_{k,i}$$

are j, j∈{0, 1}. FIG. 7 is a graph which compares blind seed detection of soft, hard, and no combining with the knowledge of coding scheme. More particularly, FIG. 7 shows the scrambling seed detection probability versus SNR values for the performance comparison of soft combining, hard combining, and no combining approaches with ($N_r$=12) and 24, all with the knowledge of coding. Here the smallest $\ell$ that $(\tilde{G}_k F_k^2)^T \tilde{G}_k F_k^2$ is invertible is 68, and (N=$N_r$−1). As shown in FIG. 7, the performance of hard combining schemes is poor in low SNR regions and only slightly better in high SNR regions compared to that of soft combining schemes. The described soft combining approach achieves about 2 dB performance gain in low SNR regions compared to hard combining approach. Moreover, the described soft combining approach achieve approximately 1.0-1.5 dB gain from low to high SNR regions over no combining case for the same detection performance. This shows the effectiveness of the described scrambling seed detection method. As also shown in FIG. 7, doubling the number of repetitions $N_r$ for soft combining from 12 to 24 does not provide significant improvement in SNR gain. Therefore, ($N_r$=12) is a good trade-off between detection performance and computational complexity.

C. Coding Knowledge Vs. No Coding Knowledge

Figure 8:
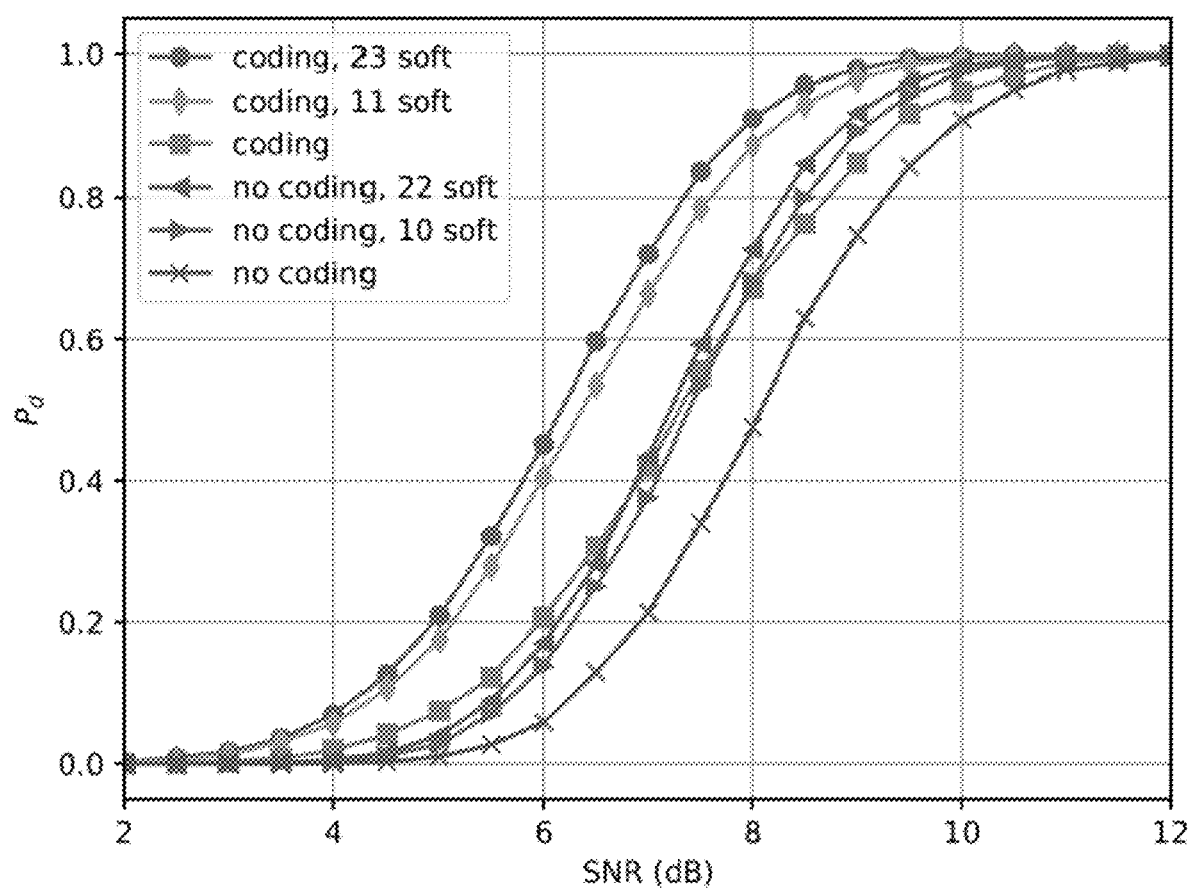
FIG. 8 is a graph which compares blind seed detection of soft and no combining with or without the knowledge of coding scheme.

Next, the performance of soft combining with and without the knowledge of coding is compared. FIG. 8 is a graph which compares blind seed detection of soft and no combining with or without the knowledge of coding scheme. More particularly, FIG. 8 shows the scrambling seed detection probability versus SNR values for the performance comparison of soft combining with the coding knowledge, soft combining with no coding knowledge, and no combining with and without the coding knowledge. $N_r$ is set to 12 and 24. As shown in the figure, the described soft combining method with coding knowledge generally achieves 1.0-1.2 dB SNR gain over the described soft combining approach without such knowledge for the same detection performance. Even without combining, the knowledge of coding improves the SNR gain by 0.3-0.7 dB. This is expected because the knowledge of coding is exploited to cancel out the effect of the coding in its null subspace revealing the effect of the unknown scrambling states for seed detection. Without such knowledge, one can only reply on the cancellation of the descrambled data by the addition of two repetitions in GF(2). Since the cancellation is generally not perfect with the received noisy scrambled data, the performance is degraded compared to the case with the coding knowledge. Nevertheless, without the coding knowledge, soft combining achieves 0.5-1.0 dB SNR gain over the no combining case. Moreover, the performance of soft combining with no coding knowledge is comparable to that of no combining with the coding knowledge. Therefore, the described soft combining method compensates the performance loss due to the lack of the coding knowledge.

As described in this disclosure, a blind scrambling seed detection method is described utilizing the soft combining of repetitive rate matching structure in the received noisy scrambled data for counter-UAS systems to detect and decode the data transmitted by the LTE-based drones. The described method can be used with or without the knowledge of coding scheme. With the knowledge of coding scheme, the described method with soft combining achieves SNR gain in low SNR regions over hard combining and no combining cases. Even without the coding knowledge, the described soft combining method compensates the performance loss due to the lack of the coding knowledge compared to the case of no combining with coding knowledge. Thus, the described method significantly enhances the performance for blind scrambling seed detection in noisy channels.

The drone detection functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks and modules described in connection with the embodiments disclosed herein, e.g., functional block diagrams in FIGS. 1-5 above, can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

APPENDIX A

Proof of Lemma 1

It is desirable to prove $\mathfrak{L}(\oplus_{i=0}^{N-1} a_i) = \Pi_{i=0}^{N-1} \mathfrak{L}(a_i)$. N can be an even or odd number:
  (i) N even, number of $a_i=0$ odd: (Left) $\mathfrak{L}(\oplus_{i=0}^{N-1} a_i) = 1 \Rightarrow \mathfrak{L}(\oplus_{i=0}^{N-1} a_i) = -1.0$. (Right) number of $\mathfrak{L}(a_i) = -1$ odd, number of $\mathfrak{L}(a_i) = +1$ odd $\Rightarrow \mathfrak{L}(\oplus_{i=0}^{N-1} a_i) = -1.0$.
  (ii) N even, number of $a_i=1$ even, number of $a_i=1$ even: (Left) $\oplus_{i=0}^{N-1} a_i = 1 \Rightarrow \mathfrak{L}(\oplus_{i=0}^{N-1} a_i) = +1.0$. (Right) number of $(a_i) = 1$ even, number of $(a_i) = +1$ even $\Rightarrow \Pi_{i=0}^{N-1} \mathfrak{L}(a_i) = +1.0$.
  (iii) N odd, number of $a_i=1$ odd, number of $a_i=0$ even: (Left) $\oplus_{i=0}^{N-1} a_i = 1 \Rightarrow \mathfrak{L}(\oplus_{i=0}^{N-1} a_i) = -1.0$. (Right) number of $(a_i) = -1$ odd, number of $(a_i) = +1$ even $\Rightarrow \Pi_{i=0}^{N-1} \mathfrak{L}(a_i) = +1.0$.

(iv) N odd number of $a_i=1$ even, number of $a_i=0$ odd: (Left) $\oplus_{i=0}^{N-1} a_i = 0 \Rightarrow \mathcal{L}(\oplus_{i=0}^{N-1} a_i) = +1.0$. (Right) number of $(a_i)=-1$ even, number of $(a_i)=+1$ odd $\Rightarrow \Pi_{i=0}^{N-1} \mathcal{L}(a_i) = +1.0$.

From (i)-(iv), $\mathcal{L}(\oplus_{i=0}^{N-1} a_i) = \Pi_{i=0}^{N-1} \mathcal{L}(a_i)$.

APPENDIX B

Proof of Lemma 3

Let $z = x \cdot y \in \{0,1\}$. From the multiplication table of GF(2) or the truth table of logical AND, z is 1 only if both x and y are 1. Equivalently, using Definition 1, $\mathcal{L}(z) = -1.0$ only if both $\mathcal{L}(x) = -1.0$ and $\mathcal{L}(y) = -1.0$. To express $\mathcal{L}(z)$ in terms of $\mathcal{L}(y)$, the following three cases are provided:

(i) $\mathcal{L}(y) = +1.0:(-1)^{xy} = +1$, $\mathcal{L}(z) = +1.0 = \mathcal{L}(y)$.
(ii) $\mathcal{L}(y) = -1.0$, $x=0:(-1)^{xy} = -1$, $\mathcal{L}(z) = +1.0 = -\mathcal{L}(y)$.
(iii) $\mathcal{L}(y) = -1.0$, $x=1:(-1)^{xy} = +1$, $\mathcal{L}(z) = -1.0 = \mathcal{L}(y)$.

From (i)-(iii), $(z) = \mathcal{L}(x \cdot y) = (-1)^{xy} \mathcal{L}(y)$.

What is claimed is:

1. A system for detecting communications with a drone, the system comprising:
    a radio-frequency (RF) receiver configured to receive an RF signal transmitted between the drone and a controller, the RF signal including scrambled data r based on known scramblers with an unknown scrambling seed s;
    a hardware processor; and
    a memory device in communication with the hardware processor and having stored computer-executable instructions to cause the hardware processor to:
        obtain a predetermined matrix based at least in part on a state transition matrix F of the known scramblers, and
        determine the unknown scrambling seed s based on a function including the predetermined matrix, segments of a scrambler output sequence f with known initial states, and segments of the scrambled data r.

2. The system of claim 1, wherein the RF receiver is configured to receive the RF signal with OFDM modulated data and known channel codes that has a sufficiently high signal-to-noise ratio (SNR) such that all scrambled bits that contain at least one repetition of unscrambled data are received over a channel.

3. The system of claim 1, wherein the instructions cause the hardware processor to further determine a smallest number of data bits required in each segment of the received data r for data combining to determine the unknown scrambling seed s using a state transition matrix C of a channel coder and a state transition matrix R of a rate matcher to find a null subspace matrix of a matrix RC and a Moore-Penrose inverse of the predetermined matrix.

4. The system of claim 1, wherein the instructions cause the hardware processor to further determine the unknown scrambling seed s based on the scrambled data r.

5. The system of claim 1, wherein the RF receiver is configured to receive the scrambled data r as modulated symbols and obtain real log-likelihood ratio (LLR) values from modulation de-mapping.

6. The system of claim 5, wherein the instructions cause the hardware processor to derive a seed estimate in terms of the LLR values for each repetition, and soft combining the seed estimates for all repetitions.

7. The system of claim 1, wherein the instructions cause the hardware processor to decode and identify a drone using the detected scrambling seed s.

8. The system of claim 1, wherein the instructions cause the hardware processor to determine a smallest number of data bits required in each segment of the scrambled data r for data combining to determine the unknown scrambling seed s by finding the predetermined matrix based on additions of two submatrices of the state transition matrix F in Galois Field of two elements GF(2) and a Moore-Penrose inverse of the predetermined matrix.

9. The system of claim 1, wherein the instructions cause the hardware processor to obtain a soft combined estimate of the unknown scrambling seed s based on selecting different segments of the scrambled data r that contains repetitions of unscrambled data.

10. The system of claim 1, wherein the function used to determine the unknown scrambling seed s further includes the scrambler output sequence f of the state transition matrix F based on the known scrambling seeds.

11. A method of detecting communications with a drone, the method comprising:
    receiving a radio frequency (RF) signal transmitted between the drone and a controller, the RF signal including scrambled data r based on known scramblers and an unknown scrambling seed s;
    obtaining by a hardware processor a predetermined matrix based at least in part on a state transition matrix F of the known scramblers; and
    determining by the hardware processor the unknown scrambling seed s based on a function including the predetermined matrix, segments of a scrambler output sequence f with known initial states, and segments of the scrambled data r.

12. The method of claim 11, wherein receiving the RF signal with OFDM modulated data and known channel codes occurs that has a sufficiently high signal-to-noise ratio (SNR) such that all scrambled bits that contain at least one repetition of unscrambled data are received over a channel.

13. The method of claim 11, further comprising determining a smallest number of data bits required in each segment of the received data r for data combining to determine the unknown scrambling seed s using a state transition matrix C of channel coder and a state transition matrix R of a rate matcher to find a null subspace matrix of a matrix RC and a Moore-Penrose inverse of the predetermined matrix.

14. The method of claim 11, further comprising determining the unknown scrambling seed s based on the scrambled data r.

15. The method of claim 11, wherein receiving the scrambled data r is achieved as modulated symbols and obtain real log-likelihood ratio (LLR) values from modulation de-mapping.

16. The method of claim 15, further comprising deriving a seed estimate in terms of the LLR values for each repetition, and soft combining the seed estimates for all repetitions.

17. The method of claim 11, further comprising decoding and identifying a drone using the detected scrambling seed s.

18. The method of claim 11, further comprising:
    receiving the RF signal with OFDM modulated data and unknown channel codes that has a sufficiently high signal-to-noise ratio (SNR) such that all scrambled bits that contain at least two repetitions of unscrambled data are received over a channel.

19. The method of claim 12, further comprising:
    determining a smallest number of data bits required in each segment of the scrambled data r for data combining and find the predetermined matrix based on addition of two submatrices of the state transition matrix F in Galois Field of two elements GF(2) and a Moore-Penrose inverse of the predetermined matrix.

20. The system of claim 12, further comprising:
obtaining a soft combined estimate of the unknown scrambling seed s based on selecting different segments of the scrambled data r that contains repetitions of unscrambled data.

\* \* \* \* \*